United States Patent
Maehara et al.

(10) Patent No.: US 10,974,274 B2
(45) Date of Patent: Apr. 13, 2021

(54) DEVICE FOR IMPREGNATING PARTICLES INTO A NON-WOVEN FABRIC

(71) Applicant: TOYOTA BOSHOKU KABUSHIKI KAISHA, Aichi-ken (JP)

(72) Inventors: Kazuo Maehara, Aichi-ken (JP); Ryo Nakajima, Aichi-ken (JP); Hiromasa Tonozuka, Kanagawa-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/988,528

(22) Filed: May 24, 2018

(65) Prior Publication Data

US 2018/0340294 A1 Nov. 29, 2018

(30) Foreign Application Priority Data

May 29, 2017 (JP) .............................. JP2017-105970

(51) Int. Cl.
*B05C 11/02* (2006.01)
*B05C 19/04* (2006.01)
(Continued)

(52) U.S. Cl.
CPC ........ *B05C 11/028* (2013.01); *B05B 17/0646* (2013.01); *B05C 19/04* (2013.01);
(Continued)

(58) Field of Classification Search
CPC ......... B05C 9/14; B05C 11/028; B05C 11/08; B29C 65/086; D06M 17/06; D06M 10/02; D06M 10/04
(Continued)

(56) References Cited

U.S. PATENT DOCUMENTS 3,286,007 A * 11/1966 Wilkie ..................... D04H 1/60
264/109
3,520,251 A * 7/1970 Bodine .................... B01J 19/10
100/118
(Continued)

FOREIGN PATENT DOCUMENTS

CN 101638846 A 2/2010
CN 102822118 A 12/2012
(Continued)

OTHER PUBLICATIONS

Office Action issued in Germany Counterpart Patent Appl. No. 102018112168.7, dated Feb. 16, 2019, along with an English translation thereof.
(Continued)

*Primary Examiner* — Karl Kurple
(74) *Attorney, Agent, or Firm* — Greenblum & Bernstein, P.L.C.

(57) ABSTRACT

The particle impregnating device includes a placing body for placing a nonwoven fabric having a surface on which particles are sprayed; a vibrating member which is provided above the placing body and extends in the width direction of the nonwoven fabric placed on the placing body; a vibrator which applies ultrasonic vibration to the vibrating member; a lifting mechanism which lifts up and down the vibrating member; and a moving mechanism which relatively moves the nonwoven fabric and the vibrating member in a surface direction orthogonal to the width direction of the nonwoven fabric. When the nonwoven fabric and the vibrating member are relatively moved by the moving mechanism, the vibrating member is lowered by the lifting mechanism, so that the nonwoven fabric is pressed and compressed by the vibrating member and ultrasonic vibration is applied to the vibrating member by the vibrator.

15 Claims, 8 Drawing Sheets

(51) Int. Cl.
| | |
|---|---|
| B05B 17/00 | (2006.01) |
| B05C 11/08 | (2006.01) |
| D06M 23/08 | (2006.01) |
| D06M 10/04 | (2006.01) |
| D06M 10/02 | (2006.01) |
| D06B 13/00 | (2006.01) |
| B05D 1/12 | (2006.01) |
| B05D 1/42 | (2006.01) |
| B05C 3/05 | (2006.01) |
| D06B 15/00 | (2006.01) |
| B05C 9/14 | (2006.01) |
| B06B 3/00 | (2006.01) |
| B29C 65/00 | (2006.01) |

(52) U.S. Cl.
CPC .............. *B05D 1/12* (2013.01); *B05D 1/42* (2013.01); *D06B 13/00* (2013.01); *D06M 10/02* (2013.01); *D06M 10/04* (2013.01); *D06M 23/08* (2013.01); *B05C 3/05* (2013.01); *B05C 9/14* (2013.01); *B05C 11/02* (2013.01); *B05C 11/023* (2013.01); *B05C 11/08* (2013.01); *B06B 3/00* (2013.01); *B06B 2201/72* (2013.01); *B29C 66/7292* (2013.01); *B29C 66/8122* (2013.01); *D06B 15/00* (2013.01); *Y10T 156/1744* (2015.01)

(58) Field of Classification Search
USPC ...................................... 156/580.2
See application file for complete search history.

(56) References Cited

U.S. PATENT DOCUMENTS

| | | | | |
|---|---|---|---|---|
| 3,966,519 A | * | 6/1976 | Mitchell | B29C 65/086 156/73.1 |
| 4,166,034 A | * | 8/1979 | Bodine | B01D 35/20 210/384 |
| 4,204,011 A | | 5/1980 | Tanabe et al. | |
| 4,259,399 A | * | 3/1981 | Hill | B29C 65/086 156/238 |
| 4,311,540 A | * | 1/1982 | Hill | B29C 65/086 156/580.1 |
| 4,394,208 A | * | 7/1983 | Wang | D04H 1/555 156/296 |
| 4,504,539 A | * | 3/1985 | Petracek | B29C 65/086 156/296 |
| 4,659,614 A | * | 4/1987 | Vitale | B29C 65/086 428/218 |
| 4,761,871 A | * | 8/1988 | O'Connor | B29C 66/21 29/432.1 |
| 5,085,719 A | * | 2/1992 | Eck | B29C 65/08 156/580.1 |
| 5,091,036 A | * | 2/1992 | Taylor | B29C 35/0261 156/180 |
| 5,269,860 A | * | 12/1993 | Rice | B29C 66/1122 156/580.1 |
| 5,288,348 A | * | 2/1994 | Modrak | D04H 1/559 156/62.2 |
| 5,989,370 A | * | 11/1999 | Wannebo | B29C 65/086 156/290 |
| 7,645,353 B2 | * | 1/2010 | Thomaschefsky | B32B 5/26 156/73.1 |
| 7,938,160 B2 | * | 5/2011 | Masuda | H01R 43/0207 228/110.1 |
| 8,287,677 B2 | * | 10/2012 | Lake | B32B 37/144 156/163 |
| 9,011,981 B2 | * | 4/2015 | Bonin | D04H 1/60 427/474 |
| 9,039,955 B2 | | 5/2015 | Murata et al. | |
| 9,132,042 B2 | | 9/2015 | Nakakado et al. | |
| 2005/0156015 A1 | * | 7/2005 | Jayaraman | H05K 1/0289 228/248.1 |
| 2008/0083481 A1 | * | 4/2008 | Jayaraman | H05K 1/0289 156/60 |
| 2008/0155766 A1 | * | 7/2008 | Janssen | D06B 13/00 8/444 |
| 2008/0223502 A1 | * | 9/2008 | Kawada | H05K 3/0097 156/73.4 |
| 2009/0004401 A1 | * | 1/2009 | Nojo | B05C 9/14 427/508 |
| 2010/0218881 A1 | * | 9/2010 | Yamamoto | A61F 13/15739 156/73.1 |
| 2012/0097339 A1 | * | 4/2012 | Hull | B29C 65/08 156/580.1 |
| 2013/0009348 A1 | | 1/2013 | Murata et al. | |
| 2013/0168893 A1 | * | 7/2013 | Jaganathan | B03C 3/28 264/85 |
| 2014/0103563 A1 | * | 4/2014 | Gray | A61F 13/15577 264/101 |
| 2014/0311654 A1 | * | 10/2014 | Hansen | B29C 65/08 156/73.1 |
| 2015/0144270 A1 | | 5/2015 | Nakakado et al. | |
| 2015/0158247 A1 | * | 6/2015 | Heeg | B29C 66/83411 156/73.1 |
| 2016/0114494 A1 | * | 4/2016 | Carrasco | B26D 7/086 83/14 |
| 2016/0129630 A1 | * | 5/2016 | Heeg | B29C 66/232 156/367 |
| 2016/0228909 A1 | | 8/2016 | Marel | |
| 2018/0345587 A1 | * | 12/2018 | Watts | B29C 65/087 |

FOREIGN PATENT DOCUMENTS

| | | |
|---|---|---|
| CN | 102962763 A | 3/2013 |
| CN | 104470479 A | 3/2015 |
| DE | 2056104 | 5/1972 |
| JP | 2010-143163 A | 7/2010 |
| JP | 2012-136592 | 7/2012 |
| JP | 2016-534237 A | 11/2016 |

OTHER PUBLICATIONS

Chinese Office Action, Chinese Patent Office, Application No. 201810510559.7, dated May 15, 2020, English translation thereof.
Japanese Office Action, Japanese Patent Office, Application No. 2017-105970, dated Sep. 29, 2020, with English translation.

* cited by examiner

DEVICE FOR IMPREGNATING PARTICLES INTO A NON-WOVEN FABRIC

CROSS-REFERENCE TO RELATED APPLICATIONS

The present application claims priority under 35 U.S.C. § 119 of Japanese Application No. 2017-105970 filed on May 29, 2017, the disclosure of which is expressly incorporated by reference herein in its entirety.

BACKGROUND

1. Technical Field

The present invention relates to a particle impregnating device, more specifically to a particle impregnating device for impregnating particles sprayed on a surface of a nonwoven fabric into the nonwoven fabric.

2. Related Art

A wet impregnating method and a dry impregnating method for impregnating particles into a nonwoven fabric are commonly known as conventional particle impregnating methods. This wet impregnating method normally involves dispersing particles in a liquid and immersing a nonwoven fabric in the liquid, thereby impregnating the particles into the nonwoven fabric. The dry impregnating method normally involves applying particles onto a surface of a nonwoven fabric and pressing and flattening the nonwoven fabric with a roller, thereby impregnating the particles into the nonwoven fabric (for example, JP 2012-136592 A).

Specifically, the wet impregnating method employs, for example, an impregnating device including a water bath 104A in which a powder (particles) 103 is dispersed, a dehydrating roll 104B and a dry furnace 104C, as shown in FIG. 8. The nonwoven fabric 102 withdrawn from the rolls passes though the inside of the water bath 104A so that the powder 103 is penetrated into the nonwoven fabric 102. After passing through the inside of the water bath 104A, the nonwoven fabric 102 is dehydrated by the dehydrating roll 104B to remove excessive moisture and then passes through the drying furnace 104C to evaporate the moisture remaining within the nonwoven fabric 102. Then, the nonwoven fabric 102 is cut into a required size after passing through the drying furnace 104C.

The dry impregnating method employs, for example, an impregnating device including a belt conveyor 111A and a plurality of rollers 111B, as shown in FIG. 9. Each roller 111B is driven in a direction of feeding out a nonwoven fabric 202 forward D and is adjustable in height, and is retained in a state where a gap between the rollers 111B and the conveyor belt is smaller than the thickness of the nonwoven fabric 202. The continuous body or the nonwoven fabric 202 that has been cut is placed on the conveyor 111A, and conveyed forward D by drive of the conveyor 111A. During the conveyance, a powder 203 is sprayed on a surface of the nonwoven fabric 202 by a powder spraying machine 111C, and the nonwoven fabric 202 is allowed to pass through the plurality of rollers 111B arranged in the front side of the powder spraying machine 111C to compress the nonwoven fabric 202 by the respective rollers 111B, whereby the powder 203 on the surface of the nonwoven fabric 202 is impregnated into the nonwoven fabric 202.

However, the conventional wet impregnating method requires a step of drying a nonwoven fabric after impregnation of particles and has many disadvantages such as increases in sizes of facilities and manufacturing steps and a higher running cost of drying energy. The conventional dry impregnating method requires many rollers (for example, 50 rollers), and thus involves problems of an increase in sizes of facilities, increases in investment and installation space due to such a size increase, and very difficult adjustment of a clearance between the rollers and the conveyor belt. Especially, the particles are adhered to the surfaces of the rollers, leading to the reduction in impregnating property of the particles into the nonwoven fabric.

SUMMARY

An embodiment of the present invention has been made in light of the aforementioned actual situation, and an object thereof is to provide a particle impregnating device having a small and inexpensive structure that can effectively impregnate particles into a nonwoven fabric.

One aspect of the present embodiments provides a particle impregnating device for impregnating particles sprayed on a surface of a nonwoven fabric into the nonwoven fabric, the particle impregnating device comprising: a placing body for placing the nonwoven fabric having a surface on which particles are sprayed; a vibrating member which is provided above the placing body and extends in the width direction of the nonwoven fabric placed on the placing body; a vibrator which applies ultrasonic vibration to the vibrating member; a lifting mechanism which lifts up and down the vibrating member; and a moving mechanism which relatively moves the nonwoven fabric and the vibrating member in a surface direction orthogonal to the width direction of the nonwoven fabric, wherein, when the nonwoven fabric and the vibrating member are relatively moved by the moving mechanism, the vibrating member is lowered by the lifting mechanism, so that the nonwoven fabric is pressed and compressed by the vibrating member and ultrasonic vibration is applied to the vibrating member by the vibrator.

In a further aspect, a free end side of the vibrating member may press the nonwoven fabric in a linear contact state.

In a further aspect, the vibrating member may be formed in a plate shape.

In a further aspect, a plurality of the vibrators may be provided along the longitudinal direction of the vibrating member.

In a further aspect, the moving mechanism may be a conveyor comprising the placing body.

In a further aspect, a feeding roller for feeding out the nonwoven fabric may be rotatably and liftably provided above the placing body.

In a further aspect, the feeding roller may be lowered and rotationally driven when the vibrating member is lowered by the lifting mechanism.

The particle impregnating device of the present embodiment includes a placing body for placing a nonwoven fabric having a surface on which particles are sprayed; a vibrating member which is provided above the placing body and extends in the width direction of the nonwoven fabric placed on the placing body; a vibrator which applies ultrasonic vibration to the vibrating member; a lifting mechanism which lifts up and down the vibrating member; and a moving mechanism which relatively moves the nonwoven fabric and the vibrating member in a surface direction orthogonal to the width direction of the nonwoven fabric. When the nonwoven fabric and the vibrating member are relatively moved by the moving mechanism, the vibrating member is lowered by the lifting mechanism so that the nonwoven fabric is pressed and compressed by the vibrating member. In addition, ultrasonic vibration is applied to the vibrating member by the vibrator. Thus, the vibrating member, which vibrates ultrasonically, slides over the surface of the nonwoven fabric in a state where the vibrating member presses and compresses the nonwoven fabric.

Accordingly, the ultrasonic vibration of the vibrating member is propagated to the fibers of the nonwoven fabric and the particles, so that the particles on the surface of the nonwoven fabric are impregnated into the nonwoven fabric while the adhesion of the particles onto the vibrating member is suppressed. Further, the compression quantity of the nonwoven fabric and the contact quantity of the vibrating member are adjusted to suppress the propagation of the vibration to the lower face side of the nonwoven fabric, thereby suppressing fall of the particles from the nonwoven fabric. As a result, the particles can effectively be impregnated into the nonwoven fabric. Further, it is made possible to reduce the sizes of facilities and installation spaces, to reduce the investment, and to reduce the running cost for drying.

When a free end side of the vibrating member presses the nonwoven fabric in a linear contact state, vibration is evenly propagated over the width direction of the nonwoven fabric by the vibrating member.

Also, when the vibrating member is formed in a plate shape, reduction in weight of the vibrating member enables effective propagation of the vibration to the nonwoven fabric.

When a plurality of the vibrators are provided along the longitudinal direction of the vibrating member, vibration is evenly propagated over the width direction of the nonwoven fabric by the vibrating member.

Also, when the moving mechanism is a conveyor including the placing body, the nonwoven fabric cut into a predetermined shape can be easily moved.

Further, when a feeding roller is provided rotatably and liftably above the placing body, the nonwoven fabric is positively fed out by the rotationally driven feeding roller. Accordingly, it is possible to suppress the occurrence of differences in compression quantity and vibration propagation due to the delay in moving of the nonwoven fabric or the slip of the nonwoven fabric. In brief, the particles are further uniformly impregnated into the nonwoven fabric.

Further, in the case the feeding roller is lowered and rotationally driven when the vibrating member is lowered by the lifting mechanism, it is possible to effectively suppress the occurrence of differences in compression quantity and vibration propagation.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5A shows a state where a vibrating member is located in a waiting position; FIG. 5B shows a state where the vibrating member is lowered to a pressing position; and FIG. 5C shows a state where the vibrating member is raised to the waiting position.

FIG. 6A shows a vibrating member having a C-shaped cross section; FIG. 6B shows a vibrating member having a polygonal cross section; and FIG. 6C shows a vibrating member having a circular cross section.

DETAILED DESCRIPTION

Figure 1:
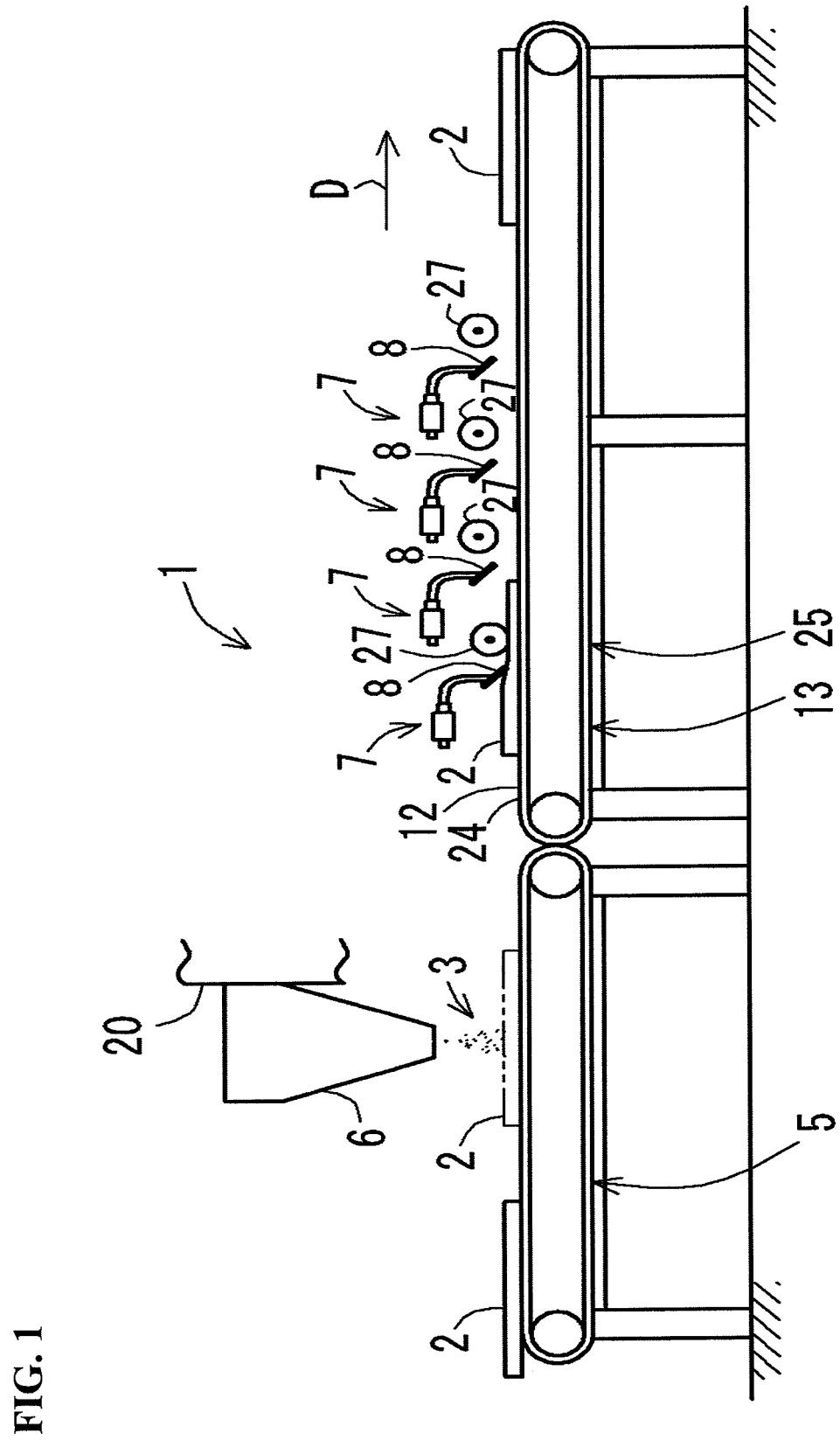
FIG. 1 is a side view of a particle impregnating device according to an Example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The particle impregnating device according to the present embodiment is a particle impregnating device (1) for impregnating particles (3) sprayed on a surface of a nonwoven fabric (2) into the nonwoven fabric, the particle impregnating device including: a placing body (12), which can be referred to as a positioner, for placing the nonwoven fabric having a surface on which particles are sprayed; a vibrating member (8, 8A, 8B, 8C), which can be referred to as a vibration applicator, is provided above the placing body and extends in the width direction (W) of the nonwoven fabric placed on the placing body; a vibrator (9) which applies ultrasonic vibration to the vibrating member; a lifting mechanism (10), which can be referred to as vibration applicator lifter, which lifts up and down the vibrating member; and a moving mechanism (13), which can be referred to as a mover, which relatively moves the nonwoven fabric and the vibrating member in a surface direction orthogonal to the width direction of the nonwoven fabric (for example, see FIGS. 1 to 4). When the nonwoven fabric (2) and the vibrating member (8, 8A to 8C) are relatively moved by the moving mechanism (13), the vibrating member is lowered by the lifting mechanism (10), so that the nonwoven fabric is pressed and compressed by the vibrating member and ultrasonic vibration is applied to the vibrating member by the vibrator (9) (for example, see FIG. 5).

The compression quantity of the nonwoven fabric (2) by the vibrating member (8, 8A to 8C) and the contact quantity of the vibrating member are not particularly limited, and are appropriately selected according to the material, size, thickness and the like of the nonwoven fabric. This nonwoven fabric can be compressed by pressing of a pressing member so that the thickness thereof is, for example, 40% to 80% (preferably 50% to 70%).

The material, size, thickness and the like of the nonwoven fabric (2) are not particularly limited. This nonwoven fabric can contain, for example, fibers. Examples of the fibers include inorganic fibers (glass fibers and carbon fibers of carbon and the like), organic fibers (natural fibers such as plant fibers and animal fibers) and thermoplastic resin fibers. Examples of the plant fibers include vein plant fibers (for example, abaca, sisal and agave); bast plant fibers (for example, flax, jute, hemp, kenaf and ramet); woody plant fibers (for example, plant fibers collected from broad-leaved trees and conifers); and other plant fibers (coconut shell fibers, oil palm empty fruit bunch fibers, rice straw fibers, wheat straw fibers, bamboo fibers and cotton). Further, examples of the thermoplastic resin include polyolefin resins, polyester resins, polystyrene resins, acryl resins, polyamide resins, polycarbonate resins, polyacetal resins and ABS resins.

Examples of the intended uses of the nonwoven fabric (2) after press-molding include interior substrates in various fields of vehicles (for example, automobiles and railway vehicles), aircrafts, ships, architecture and the like. Specifically, examples of the intended uses of the interior substrate for a vehicle include a door trim, an arm rest, an ornament panel, a pillar garnish, a cowl side garnish, a center console, an overhead console, a sun visor, a deck board (luggage board), a package tray, a seat side garnish and an assist grip of an automobile. Further, examples of the intended uses of the interior substrate for architecture include a door member, various kinds of furniture (a desk, a chair, a shelf, a chest and the like), a housing body (for example, a tray), a protecting member and a partition member.

The function, shape, size and the like of the particles (3), which can be discrete particles for example, are not particularly limited. Examples of the particles include a foaming agent (expanding agent), moisture absorbing/releasing agents, a deodorant, a fragrance, an insecticide and an antimicrobial agent. For example, this foaming agent can be enclosed in a shell wall to be softened by heating. Examples of the shape of the particles include granular, strip-like and irregular shapes.

Figure 3:
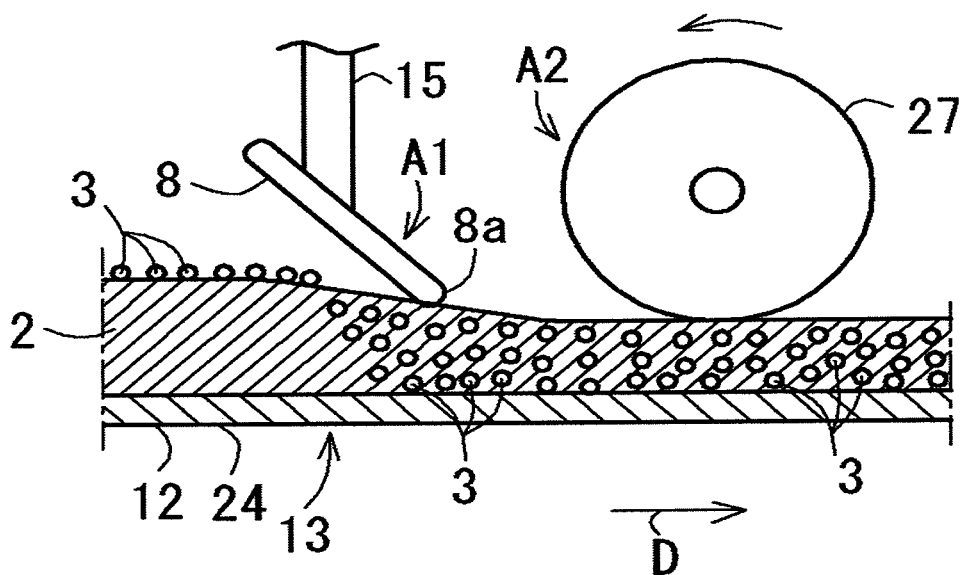
FIG. 3 is an enlarged cross sectional view of an essential part of FIG. 2.
Figure 6A:
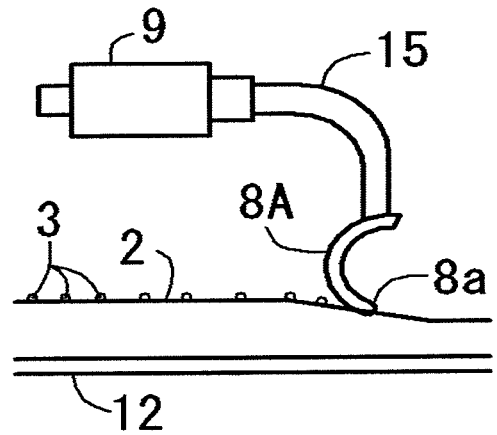
FIGS. 6A to 6C are explanatory views for explaining vibrating members of other forms.

Examples of the particle impregnating device according to the present embodiment include a form in which a free end side (8a) of the vibrating member (8, 8A to 8C) presses the nonwoven fabric in a linear contact state (for example, see FIGS. 3 and 6). This vibrating member (8, 8A) can be formed, for example, in a plate shape (for example, see FIGS. 3 and 6A). The vibrating member undergoes repelling force from the nonwoven fabric during the compression of the nonwoven fabric, and thus would be easily deformed by external force if the vibrating member has a shape with low rigidity (for example, quite thin flat plate shape), thereby making it impossible to provide a constant quantity of compression in the width direction W of the nonwoven fabric. Therefore, the vibrating member is preferably formed in a shape with increased rigidity (for example, curved plate shape, or bent plate shape).

Figure 4:
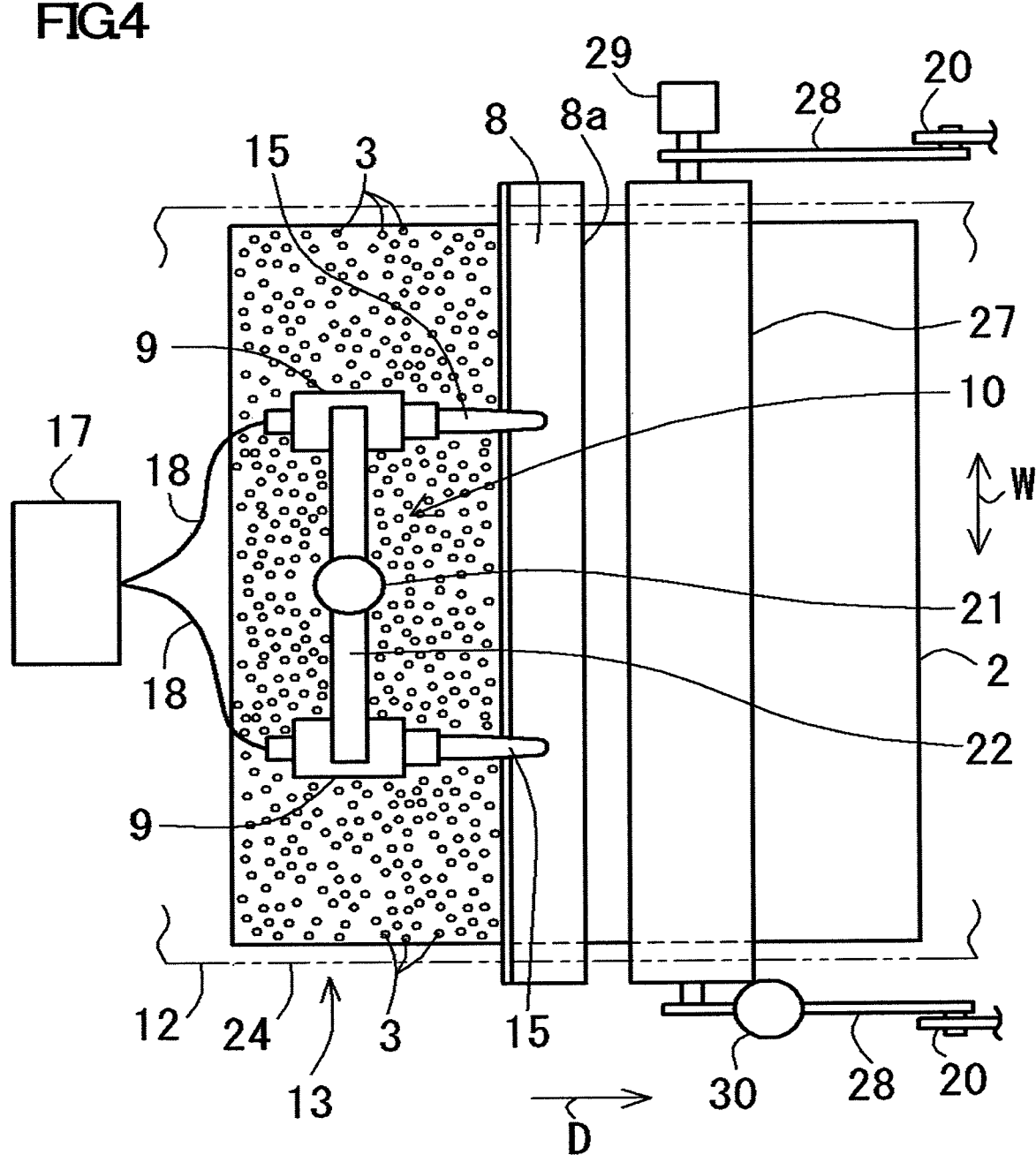
FIG. 4 is a figure when viewing the device from a direction of arrow IV shown in FIG. 2.

Examples of the particle impregnating device of the present embodiment include a form in which a plurality of the vibrators (9) are provided along the longitudinal direction of the vibrating member (8, 8A to 8C) (for example, see FIG. 4). Each of the vibrators can be connected to the vibrating member in a position where the length in the longitudinal direction of the vibrating member is equally divided.

Examples of the particle impregnating device according to the present embodiment include a form in which the moving mechanism (13) is a conveyor (25) including the placing body (12) (for example, see FIG. 1).

Figure 2:
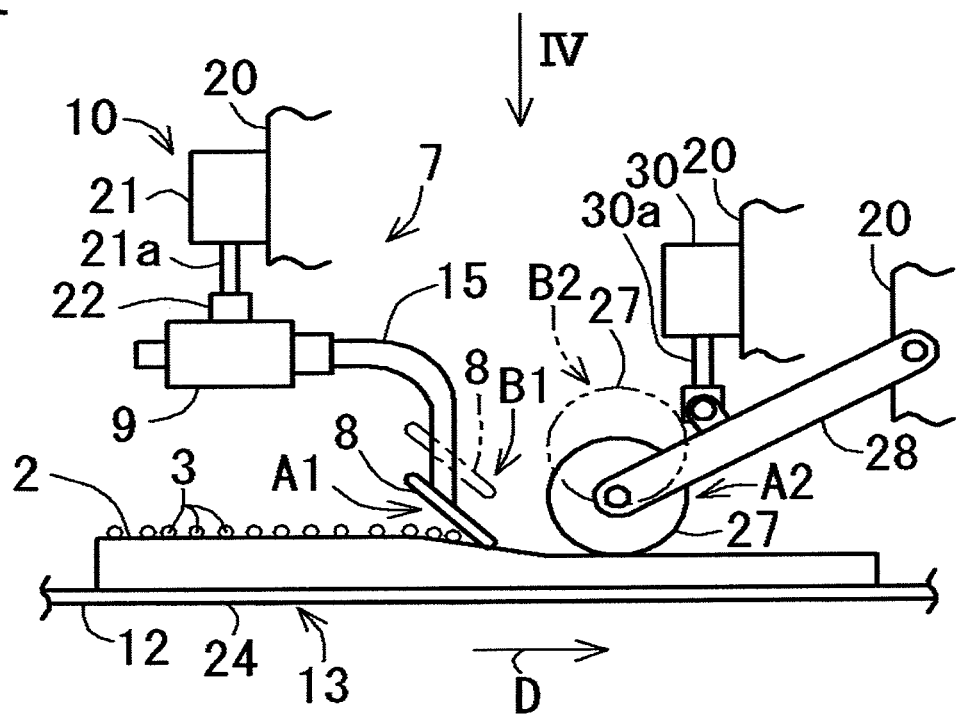
FIG. 2 is an enlarged view of an essential part of FIG. 1.

Examples of the particle impregnating device according to the present embodiment include a form in which a feeding roller (27) for feeding out the nonwoven fabric (2) is provided rotatably and liftably above the placing body (12) (for example, see FIG. 2).

The reference numerals in parentheses, which are attached to the respective features described in the above embodiment, show a correspondence relation with the specific features described in the Example which will be described below.

Examples

Hereinafter, the present invention will be explained in detail by way of Examples with reference to the drawings. In this Example, a nonwoven fabric 2 cut into a predetermined shape (for example, a flat rectangular shape) is indicated as an example of the "nonwoven fabric" according to the present invention (see FIG. 1).

(1) Construction of Particle Impregnating Device

A particle impregnating device 1 according to this Example includes a belt conveyor 5 for conveying the nonwoven fabric 2 and a well-known particle spraying machine 6 arranged above the belt conveyor 5, as shown in FIG. 1. This particle impregnating device 1 includes a plurality of (four in the figure) vibrating devices 7 arranged along a conveying direction D in which the nonwoven fabric 2 is conveyed. Each of these vibrating devices 7 includes a vibrating member 8, a vibrator 9 and a lifting mechanism 10 as will be described below. Further, the particle impregnating device 1 includes a placing body 12 for placing the nonwoven fabric 2 having a surface on which particles 3 are sprayed and a moving mechanism 13 which moves the nonwoven fabric 2 on the placing body 12 in a surface direction (specifically, conveying direction D) orthogonal to the width direction W of the nonwoven fabric 2.

The vibrating member 8 is provided above the placing body 12 and extends in the width direction W of the nonwoven fabric 2 placed on the placing body 12, as shown in FIGS. 2 to 4. As shown in the embodiment of FIG. 4, the vibrating member 8 can extend in the width direction at least as far as the entirety of the width of the nonwoven fabric placed on the placing body 12. This vibrating member 8 is formed of a metal and in a flat plate shape. One end side of a supporting member 15 which is formed of a metal and in a curved bar shape is fixed to an upper end side of the vibrating member 8 by welding, for example. The vibrator 9 is fixed to the other end side of this supporting member 15 by welding, for example. A free end side (lower end side) 8a of the vibrating member 8 presses the nonwoven fabric 2 in a linear contact state (see FIG. 3).

The vibrator 9 applies ultrasonic vibration to the vibrating member 8 via the supporting member 15. A plurality of (two in the figure) the vibrators 9 are provided along the longitudinal direction of the vibrating member 8 (see FIG. 4). Each of these vibrators 9 is connected via the supporting member 15 to the vibrating member 8 in a position where the length in the longitudinal direction of the vibrating member 8 is equally divided. To each of the vibrators 9, an oscillator 17 which vibrates the vibrator 9 in a predetermined frequency range is connected via a cable 18 (see FIG. 4). In this Example, since the supporting member 15 is formed in a curved bar shape, ultrasonic vibration is effectively applied to the vibrating member 8 by the vibrators 9.

A control part (not shown) which controls the oscillator 17 changes the frequency of the ultrasonic vibration applied from the vibrators 9 to the vibrating member 8 within a predetermined range (for example, 33 kHz to 37 kHz). The control part detects a frequency at which the impedance of the vibrating member 8 is lowered most and applies, to the vibrating member 8, ultrasonic vibration at the detected frequency as the center oscillation frequency. Such an oscillator 17 is employed so that vibration is uniformly propagated over the width direction W of the nonwoven fabric 2 by the vibrating member 8.

The lifting mechanism 10 lifts up and down the vibrating member 8 (specifically, vibrating device 7). This lifting mechanism 10 includes a cylinder 21 provided on a frame 20. A tip end side of a piston rod 21*a* of this cylinder 21 is mounted in a middle part of a support plate 22 suspended over the respective vibrators 9. By expansion and contraction of the piston rod 21*a* of the cylinder 21, the vibrating member 8 is lifted up and down between a pressing position A1 where the nonwoven fabric 2 on the placing body 12 is pressed and a waiting position B1 located above the pressing position A1 (see FIG. 2).

The moving mechanism 13 is a belt conveyor 25 including a revolvably belt 24 (i.e., placing body 12). By revolutional drive of the belt conveyor 25, the nonwoven fabric 2 placed on the belt 24 is conveyed in the conveying direction D.

Above the placing body 12, a feeding roller 27 for feeding out the nonwoven fabric 2 is provided rotatably and liftably. Specifically, the feeding roller 27 is supported rotatably on the other end side of a swinging member 28 whose one end side is freely swingably supported on the frame 20. A drive shaft of a motor 29 (see FIG. 4) is coupled to a support shaft of this feeding roller 27. The feeding roller 27 is rotationally driven by drive of this motor 29 so as to feed out the nonwoven fabric 2 in the conveying direction D (see FIG. 3). A tip end side of the piston rod 30*a* of the cylinder 30 provided on the frame 20 is mounted on the swinging member 28. The swinging member 28 is swung by expansion and contraction of the piston rod 30*a* of the cylinder 30 so that the feeding roller 27 is lifted up and down between a pressing position A2 where the nonwoven fabric 2 on the placing body 12 is pressed and a waiting position B2 located above the pressing position A2 (see FIG. 2). A plurality of the feeding rollers 27 are provided, corresponding to the plurality of vibrating members 8 (i.e., vibrating devices 7) (see FIG. 1).

(2) Action of Particle Impregnating Device

Next, the action of the particle impregnating device 1 having the above-described construction will be explained. As shown in FIG. 1, the nonwoven fabric 2 is placed on one end side on the conveyor 5 and conveyed in the conveying direction D by revolutional drive of the conveyor 5. During the conveyance of the nonwoven fabric 2, the particles 3 are sprayed on a surface of the nonwoven fabric 2 by the particle spraying machine 6. Then, the nonwoven fabric 2 having a surface on which the particles 3 are sprayed is transferred from the conveyor 5 to the conveyor 25, and starts to be conveyed in the conveying direction D by revolutional drive of the conveyor 25. At this time, the vibrating member 8 and the feeding roller 27 are located in the waiting positions B1 and B2, respectively. In this Example, the particles 3 are not sprayed on a tip end side in the conveying direction D of the nonwoven fabric 2, and the tip end side thereof is used as a grip part in the subsequent steps.

Figure 5A:
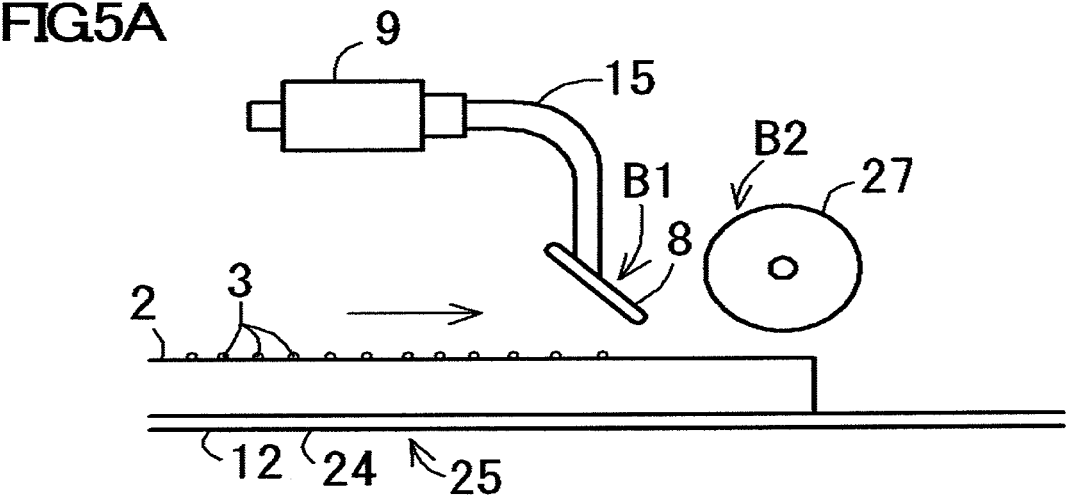
FIGS. 5A to 5C are explanatory views of the action of the particle impregnating device.
Figure 5B:
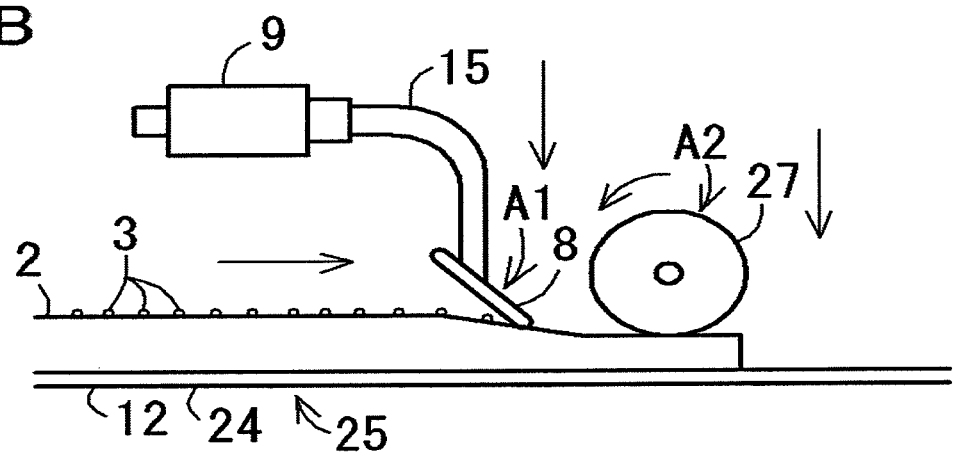

During the conveyance of the nonwoven fabric 2 by means of the conveyor 25, when the tip end side of the nonwoven fabric 2 is conveyed to a position immediately under the vibrating member 8 and the feeding roller 27 as shown in FIG. 5A, the vibrating member 8 and the feeding roller 27 are lowered from the waiting positions B1 and B2, respectively. The vibrating member 8 is vibrated by the vibrator 9 during this lowering, and the feeding roller 27 is rotationally driven. When the vibrating member 8 and the feeding roller 27 are lowered to the pressing positions A1 and A2, respectively, the tip end side of the nonwoven fabric 2 is pressed and compressed by the vibrating member 8 and the feeding roller 27 as shown in FIG. 5B and actively fed forward (i.e., conveying direction D) by the feeding roller 27. In this Example, the vibrating member 8 is lifted up and down based, for example, on detection control by a sensor or the like or timer control.

Figure 5C:
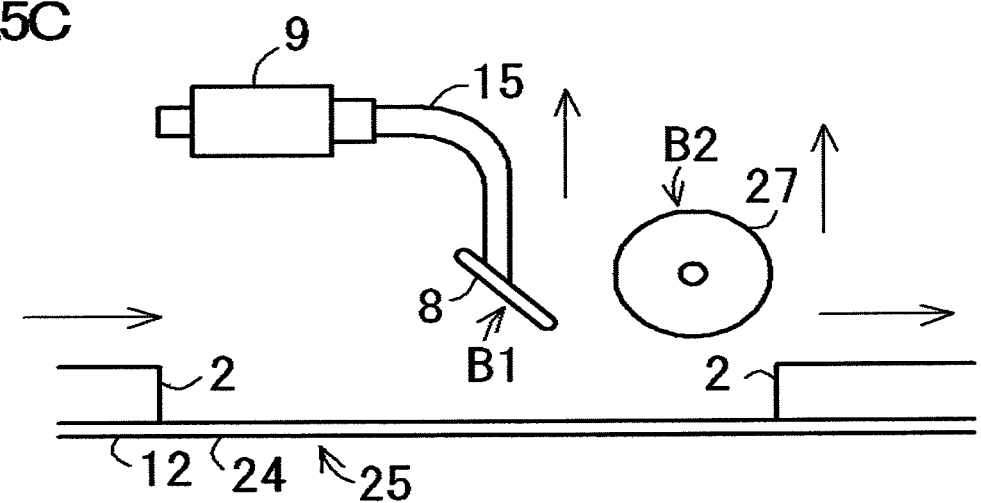

During compression of the nonwoven fabric 2 by pressing of the vibrating member 8, the vibration of the vibrating member 8 propagates to the surface and inside of the nonwoven fabric 2, as shown in FIG. 3. The high-speed vibration generates inertial force in the fibers of the nonwoven fabric 2 and the particles 3. When the inertial force is greater than the adhesion force between the fibers and the particles 3, the particles 3 are detached from the fibers and impregnated into the nonwoven fabric 2. The impregnating proportion of the particles 3 into the nonwoven fabric 2 is controlled, for example, by the time of contact between the vibrating member 8 and the nonwoven fabric 2, compression quantity of the nonwoven fabric 2 and vibration strength. Thereafter, when the vibrating member 8 and the feeding roller 27 slide over the surface of the nonwoven fabric 2 upon conveyance of the nonwoven fabric 2 by means of the conveyor 25, the rotational drive of the feeding roller 27 is stopped together with the vibration of the vibrating member 8, and the vibrating member 8 and the feeding roller 27 are raised to the original waiting positions B1 and B2, respectively, as shown in FIG. 5C, whereby the vibration treatment by the vibrating device 7 and the feeding roller 27 that are at the leading position is finished. Then, vibration treatments by the vibrating devices 7 and the feeding rollers 27 subsequent to those at the leading position are conducted in turn in a manner substantially the same as the vibration treatment by those at the leading position (see FIG. 1).

(3) Effect of the Example

The particle impregnating device 1 of the Example includes a placing body 12 for placing a nonwoven fabric 2 having a surface on which particles 3 are sprayed; a vibrating member 8 which is provided above the placing body 12 and extends in the width direction W of the nonwoven fabric 2 placed on the placing body 12; a vibrator 9 which applies ultrasonic vibration to the vibrating member 8; a lifting mechanism 10 which lifts up and down the vibrating member 8; and a moving mechanism 13 which moves the nonwoven fabric 2 in a surface direction orthogonal to the width direction W of the nonwoven fabric 2. When the nonwoven fabric 2 is moved by the moving mechanism 13, the vibrating member 8 is lowered by the lifting mechanism 10 so that the nonwoven fabric 2 is pressed and compressed by the vibrating member 8, and ultrasonic vibration is applied to the vibrating member 8 by the vibrator 9. Thus, the vibrating member 8, which ultrasonically vibrates, slides over the surface of the nonwoven fabric 2 in a state where the vibrating member 8 presses and compresses the nonwoven fabric 2. Accordingly, the ultrasonic vibration of the vibrating member 8 is propagated to the fibers of the nonwoven fabric 2 and the particle's 3, so that the particles 3 on the surface of the nonwoven fabric 2 are impregnated into the nonwoven fabric 2 while the adhesion of the particles 3 onto the vibrating member 8 is suppressed. Further, the compression quantity of the nonwoven fabric 2 and the contact quantity of the vibrating member 8 are adjusted to suppress the propagation of the vibration to the lower face side of the nonwoven fabric 2, thereby suppressing fall of the particles 3 from the nonwoven fabric 2. As a result, the particles 3 can effectively be impregnated into the nonwoven fabric 2. Further, it is made possible to reduce the sizes of facilities and installation spaces, to reduce the investment, and to reduce the running cost for drying.

Also, in the Example, the free end side 8a of the vibrating member 8 presses the nonwoven fabric 2 in a linear contact state. Thus, vibration is uniformly propagated over the width direction W of the nonwoven fabric 2 by the vibrating member 8.

Further, in the Example, the vibrating member 8 is formed in a plate shape. Due to this, the weight of the vibrating member 8 is reduced so that the vibration is effectively propagated to the nonwoven fabric 2.

Additionally, in the Example, the plurality of vibrators 9 are provided along the longitudinal direction of the vibrating member 8. Thus, vibration is uniformly propagated over the width direction W of the nonwoven fabric 2 by the vibrating member 8.

Also, in the Example, the moving mechanism 13 is the belt conveyor 25 including the placing body 12 (specifically, belt 24). Thus, the nonwoven fabric 2 cut into a predetermined shape can be easily moved.

Further, in the Example, the feeding roller 27 is provided rotatably and liftably above the placing body 12. Thus, the nonwoven fabric 2 is actively fed out by the rotationally driven feeding roller 27. Accordingly, it is possible to suppress the occurrence of differences in compression quantity and vibration propagation due to the delay in moving of the nonwoven fabric 2 or the slip of the nonwoven fabric 2. In brief, the particles 3 are further uniformly impregnated into the nonwoven fabric 2.

Figure 6B:
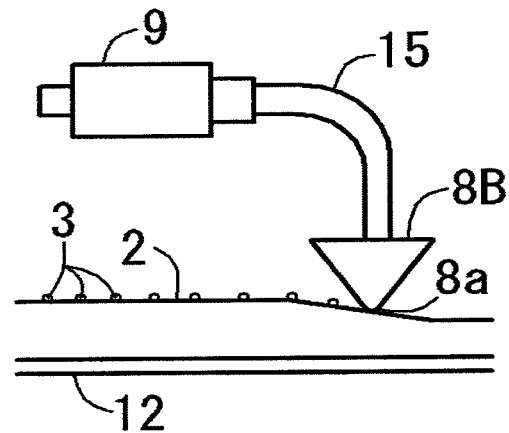
Figure 6C:
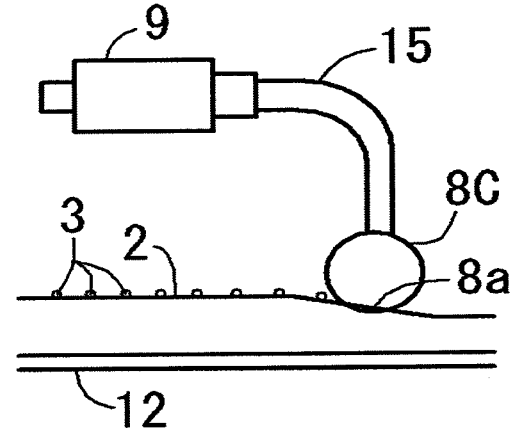

In the meantime, the present invention is not limited to the above-described Example, and Examples variously modified within the scope of the present invention can be employed depending on the purpose and intended use. In the aforementioned Example, the flat plate-shaped vibrating member 8 has been illustrated, but the present invention is not limited to this. For example, the vibrating member 8 may be a vibrating member 8A having a C-shaped cross section, as shown in FIG. 6A. For example, the vibrating member 8 may be a vibrating member 8B having a polygonal cross section having an end part sharpened downward, as shown in FIG. 6B. Further, the vibrating member 8 may be a vibrating member 8C having a circular (or oval) cross section, as shown in FIG. 6C.

Also, in the Example, the vibrating member 8 fixed on the supporting member 15 has been illustrated, but the present invention is not limited to this. For example, the vibrating member 8 may be a vibrating roller (vibrating member) freely rotatably supported by the supporting member and rotationally driven by a motor.

Figure 7:
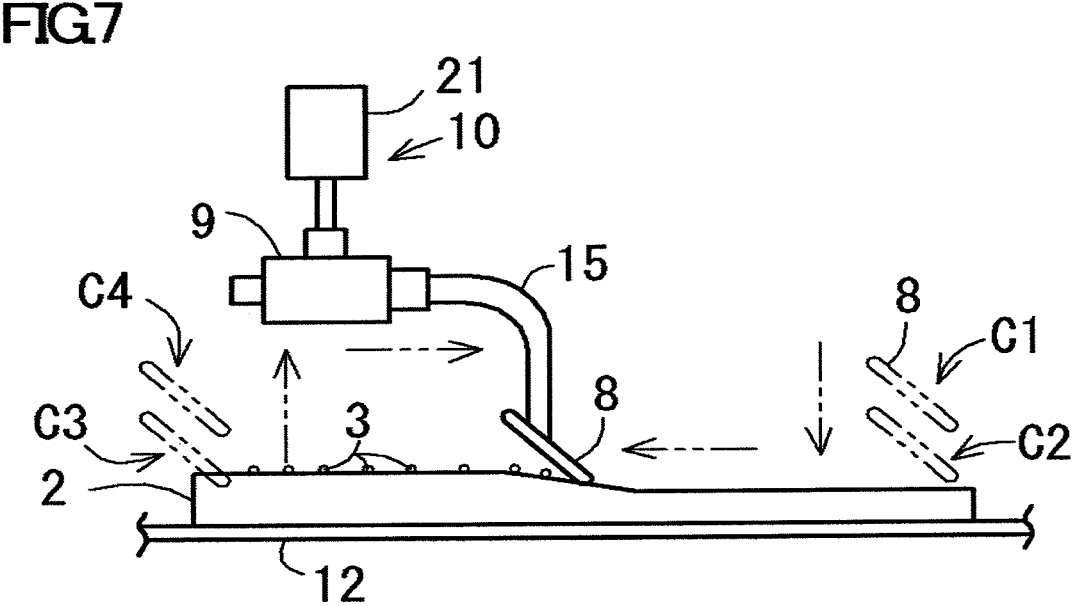
FIG. 7 is an explanatory view for explaining a particle impregnating device of another form.
Figure 8:
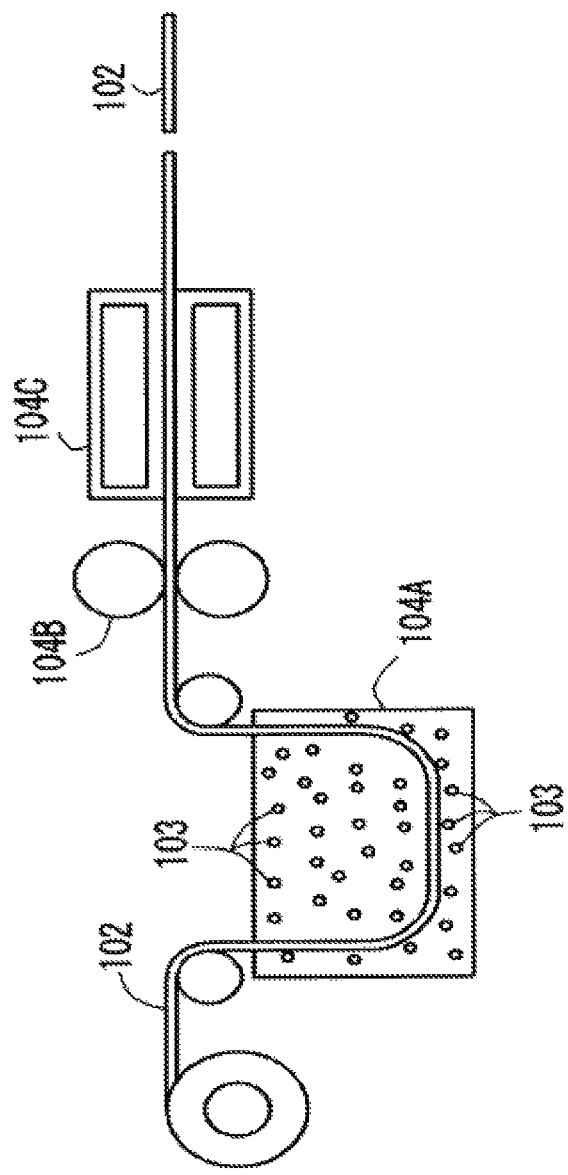
FIG. 8 is an explanatory view for explaining a conventional wet impregnating method.
Figure 9:
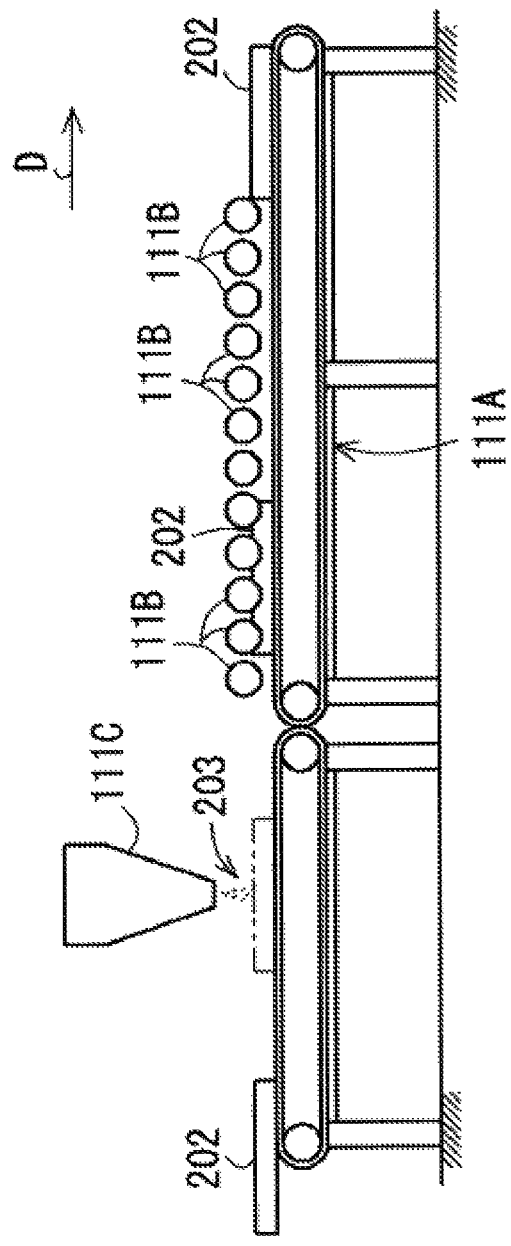
FIG. 9 is an explanatory view for explaining a conventional dry impregnating method.

Further, in the Example, the vibrating member 8 is provided so that it cannot be moved horizontally and can be lifted up and down, but the present invention is not limited to this. For example, the vibrating member 8 may be provided so that it can be moved horizontally by a sliding mechanism and can be lifted up and down by the lifting mechanism 10, as shown in FIG. 7. For example, the vibrating member 8 can be lowered from a waiting position C1 to a pressing position C2, and then horizontally moved to a pressing position C3 so as to slide in a state where it presses the entire surface of the nonwoven fabric 2, then raised to a waiting position C4 and returned to the waiting position C1. In this case, the nonwoven fabric 2 may be either placed on the placing body 12 arranged in a fixed manner or conveyed horizontally by a conveyor or the like.

In the Example, the moving mechanism 13 including the belt conveyor 25 has been illustrated, but the present invention is not limited to this. The moving mechanism 13 may a moving mechanism including, for example, a roller conveyor or a chain conveyor.

Also, in the Example, the lifting mechanism 10 driven by the cylinder 21 has been illustrated, but the present invention is not limited to this. For example, the lifting mechanism 10 may be a lifting mechanism driven by a motor.

In the Example, the form in which two vibrators are provided relative to one vibrating member has been illustrated, but the present invention is not limited to this. For example, one or at least three vibrator(s) may be provided relative to one vibrating member.

Further, in the Example, the form in which the lifting mechanisms which lift up and down the vibrating member 8 and the feeding roller 27, respectively, are independently provided has been illustrated, but the present invention is not limited to this. For example, a lifting mechanism which lifts up and down both the vibrating member 8 and the feeding roller 27 may be provided.

Further, in the Example, the particle impregnating device 1 which impregnates the particles 3 into the nonwoven fabric 2 cut into the predetermined shape has been illustrated, but the present invention is not limited to this. For example, the particle impregnating device may be intended to impregnate particles into a nonwoven fabric which is a continuous body withdrawn from rolls.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely utilized as a technique for impregnating particles into a nonwoven fabric.

What is claimed is:

1. A particle impregnating device for impregnating particles sprayed on a surface of a nonwoven fabric into the nonwoven fabric, the particle impregnating device comprising:
a positioner configured to receive the nonwoven fabric;
a vibration applicator positioned above the positioner and extending in a width direction of the nonwoven fabric placed on the positioner; said vibration applicator has an upper end side and a lower end side;
a curved support that has a curved bar shape having a first end and a second end, said first end is connected to the upper end side of the vibration applicator;
a vibrator that is connected to the second end of the curved support, said curved support is connected at the first end to the vibration applicator by welding or said curved support is connected at the second end to the vibrator by welding, and the vibrator is configured to apply an ultrasonic vibration to the vibration applicator via the curved support;

a vibration applicator lifter configured to move up and down the vibration applicator; and a mover configured to move the nonwoven fabric and the vibration applicator in relation to each other in a surface direction orthogonal to the width direction of the nonwoven fabric, wherein, when the nonwoven fabric and the vibration applicator are relatively moved by the mover, the vibration applicator, the curved support, and the vibrator are lowered by the vibration applicator lifter so that the nonwoven fabric is pressed and compressed by the vibration applicator providing a compression quantity to the nonwoven fabric, wherein the compression quantity of the nonwoven fabric is adjusted to suppress a propagation of the ultrasonic vibration to a lower face side of the nonwoven fabric and thereby suppressing the particles from falling from the nonwoven fabric when the ultrasonic vibration is applied to the vibration applicator by the vibrator and the nonwoven fabric is pressed and compressed by the vibration applicator.

2. The particle impregnating device according to claim 1, wherein a free end side of the vibration applicator presses the nonwoven fabric in a linear contact state.

3. The particle impregnating device according to claim 2, wherein the vibration applicator is formed in a plate shape.

4. The particle impregnating device according to claim 1, wherein a plurality of the vibrators are provided along a longitudinal direction of the vibration applicator.

5. The particle impregnating device according to claim 2, wherein a plurality of the vibrators are provided along a longitudinal direction of the vibration applicator.

6. The particle impregnating device according to claim 3, wherein a plurality of the vibrators are provided along a longitudinal direction of the vibration applicator.

7. The particle impregnating device according to claim 1, wherein the mover is a conveyor comprising the positioner.

8. The particle impregnating device according to claim 1, wherein a feeding roller to feed out the nonwoven fabric is rotatably and liftably provided above the positioner.

9. The particle impregnating device according to claim 8, wherein the feeding roller is lowered and rotationally driven when the vibration applicator is lowered by the vibration applicator lifter.

10. The particle impregnating device according to claim 1, wherein the vibration applicator extends over the width direction of the nonwoven fabric placed on the positioner at least as far as an entirety of the width of the nonwoven fabric.

11. A particle impregnating method for impregnating the particles sprayed on a surface of a nonwoven fabric into the nonwoven fabric using the particle impregnating device according to claim 1, the method comprising:

moving the nonwoven fabric and the vibration applicator relative to each other by the mover; and lowering the vibration applicator by the vibration applicator lifter when the nonwoven fabric and the vibration applicator are relatively moved by the mover, so that the nonwoven fabric is compressed by the vibration applicator and ultrasonic vibration is applied to the vibration applicator by the vibrator.

12. The particle impregnating device according to claim 1, wherein the device is configured to perform a dry impregnating of the particles into the nonwoven fabric.

13. The particle impregnating device according to claim 1, wherein the device is configured to impregnate granular particles in the nonwoven fabric.

14. The particle impregnating device according to claim 1, wherein the compression quantity is 40% to 80% of a thickness of the nonwoven fabric.

15. The particle impregnating device according to claim 1, wherein the compression quantity is 50% to 70% of a thickness of the nonwoven fabric.

* * * * *